A. B. WEBB.
TRACTOR.
APPLICATION FILED SEPT. 22, 1919.
1,348,192.
Patented Aug. 3, 1920.
2 SHEETS—SHEET 2.
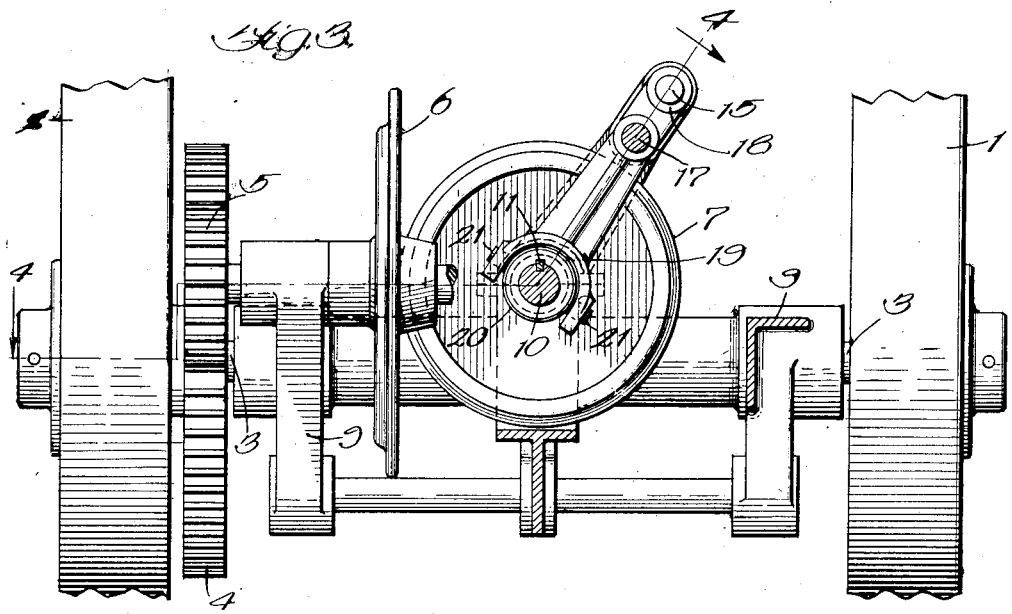
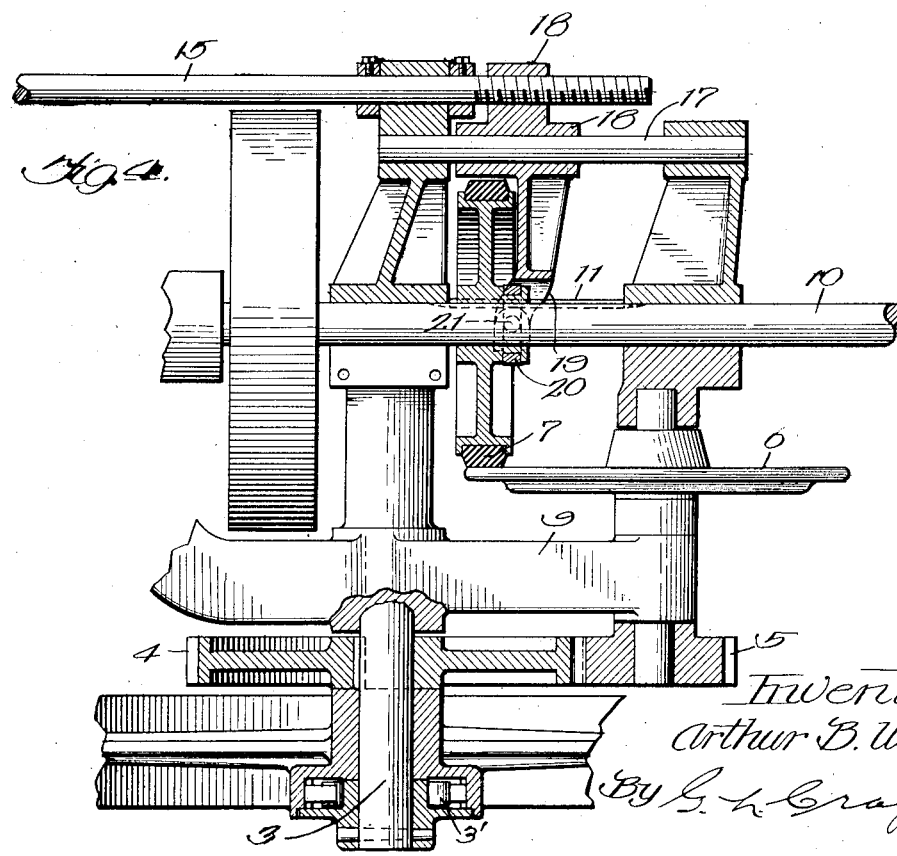

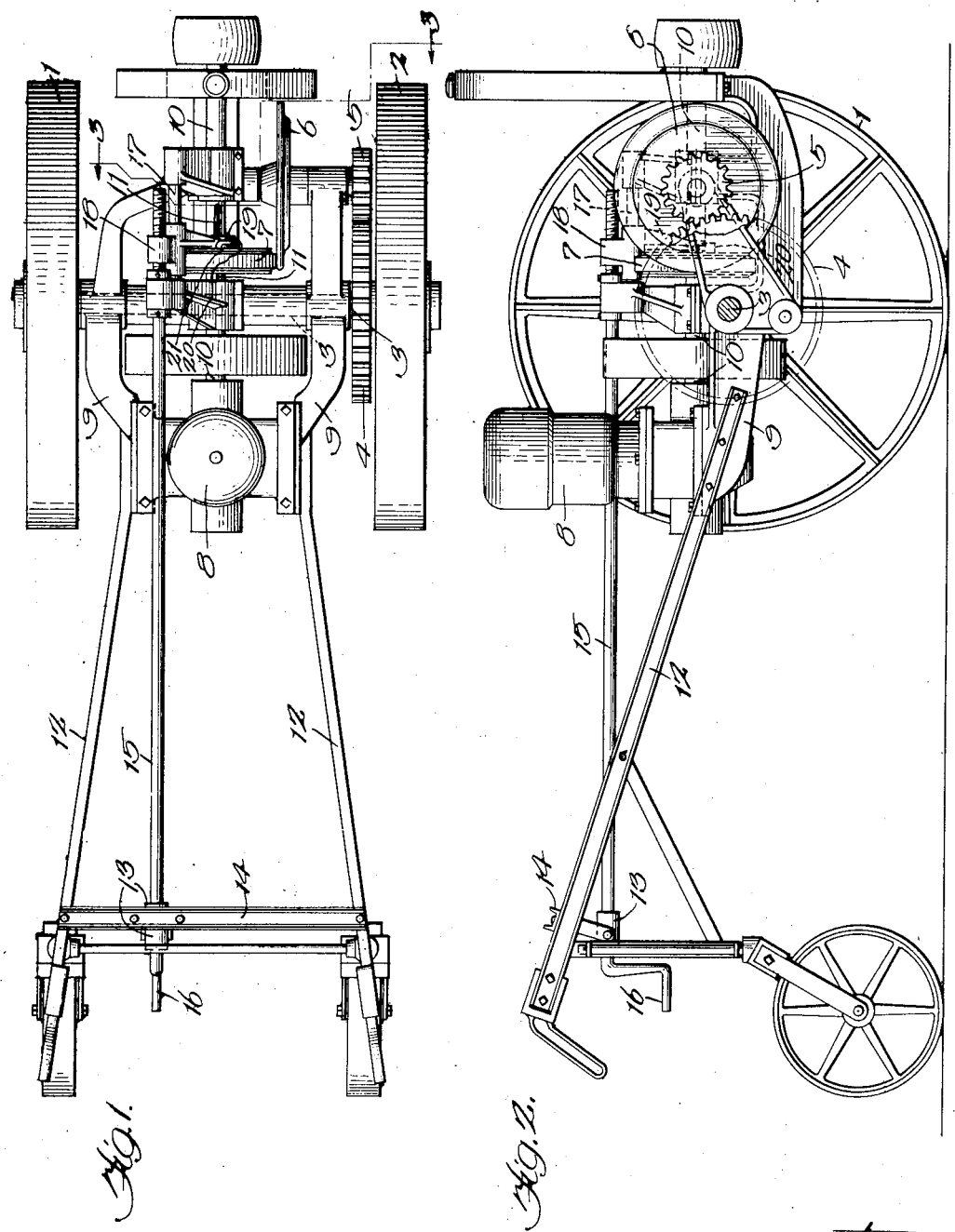

UNITED STATES PATENT OFFICE.

ARTHUR B. WEBB, OF WATERTOWN, WISCONSIN, ASSIGNOR TO WILLIAM N. SMITH, OF CHICAGO, ILLINOIS.

TRACTOR.

1,348,192. Specification of Letters Patent. Patented Aug. 3, 1920.

Application filed September 22, 1919. Serial No. 325,593.

*To all whom it may concern:*

Be it known that I, ARTHUR B. WEBB, a citizen of the United States, residing at Watertown, in the county of Jefferson and State of Wisconsin, have invented a certain new and useful Improvement in Tractors, of which the following is a full, clear, concise and exact description.

My invention relates to tractors and particularly to vehicles of this class which do not employ any steering gear.

The invention has for its object the provision of improved means, accessible to the operator while in control of the direction of travel of the machine, for governing the gearing that couples the engine with the vehicle wheel or wheels of the tractor.

The accompanying drawings show the preferred embodiment of the invention, Figure 1 being a plan view of the improved tractor; Fig. 2 is an elevation of the tractor shown in Fig. 1, the near vehicle wheel being removed to reveal details of construction; Fig. 3 is a plan view on line 3—3 of Fig. 1; and Fig. 4 is a sectional view on line 4—4 of Fig. 3.

Like parts are indicated by similar characters of reference throughout the different figures.

The tractor shown includes a pair of laterally spaced apart co-axial vehicle wheels 1, 2. These wheels are mounted upon a shaft 3 which is in driving relation to at least one of them, and preferably both, desirably through the intermediation of well known ratchet drive mechanisms 3′ permitting differential movement of the wheels. Such ratchet mechanism is so well known as not to require detailed illustration. A spur gear 4 is co-axial with the vehicle wheels and is keyed upon the shaft 3. A spur pinion 5 is in mesh with the spur gear. A friction disk 6 is co-axial with and fixed with respect to the pinion 5, the plane of rotation of the disk 6 being upright and extending longitudinally of the tractor. A second friction disk 7 is at right angles to the disk 6 and has its periphery in frictional engagement with a face of the disk 6.

The engine 8 is mounted upon a frame 9 which is carried upon the shaft 3, this frame also supporting the friction disk 6 and pinion 5. The engine shaft 10, extending longitudinally of the tractor, supports the transverse friction disk 7, the shaft being provided with a spline 11 that couples the disk 7 with the shaft in a manner to permit the disk to move longitudinally of the shaft while rotating therewith. A pair of handle bars 12 is secured to and extends rearwardly from the engine supporting frame. A bearing 13 depends from the strut 14 which unites the handle bars 12 near their rear ends. This bearing, which extends longitudinally of the tractor, supports a hand controlled shaft 15 that extends forwardly from said bearing. This shaft 15 is provided with a hand crank 16 at the rear end of the shaft 15 and on the rear side of the bearing 13, whereby said shaft may be turned. A rod 17 extends longitudinally of the tractor and is supported by the engine carrying frame 9. A shifter 18 slides upon the rod 17 and has a yoke 19 that straddles the shaft 10.

A collar 20 is movable bodily with the friction disk 7, being received in a peripheral groove in the hub of this disk in a manner to permit the disk to turn with respect to said collar. The collar carries pins 21 that are received in the bifurcated ends of the yoke 19 whereby said disk may be moved back and forward when the shifter 18 is correspondingly moved longitudinally of the tractor. The hand controlled shaft 15 has threaded engagement at its forward end with the shifter whereby the shifter may be moved forwardly or rearwardly according to the direction in which this shaft is turned by the crank 16. By this arrangement the disk 7 may be moved toward or from the center of disk 6 to change the speed of the tractor. The effective engagement between the friction disks may be broken in any suitable way not forming a part of my present invention.

Having thus described my invention I claim as new and desire to secure by Letters Patent the following:—

A tractor including a pair of laterally spaced apart co-axial vehicle wheels; a spur gear co-axial with said wheels and in driving relation to one of them; a spur pinion in mesh with said spur gear; a friction disk co-axial with and fixed with respect to said pinion; a second friction disk at right angles to and having its periphery in frictional engagement with a face of the aforesaid friction disk; an engine; a shaft driven by the engine and upon which the second aforesaid friction disk is splined to turn therewith while movable therealong; a frame upon which the engine is mounted; a pair of handle bars secured to and extending rearwardly from said frame; a bearing extending longitudinally of the tractor and supported at the rear ends of said handle bars; a hand controlled shaft extending forwardly from and journaled at its rear end in said bearing and provided upon the rear side of said bearing with a hand crank whereby it may be turned; a rod extending longitudinally of the tractor and supported upon the aforesaid frame; a shifter for the second aforesaid friction disk slidable upon said rod to slide this disk upon the engine shaft, said hand controlled shaft having its forward end in threaded engagement with said shifter whereby the second aforesaid disk may be moved toward or from the center of the first aforesaid disk.

In witness whereof I hereunto subscribe my name this 27th day of May A. D. 1919.

ARTHUR B. WEBB.